April 23, 1929. H. L. BLACKMAN Re. 17,282

HOLDER FOR FOUNTAIN PENS

Original Filed Aug. 19, 1926

Inventor
Horace L. Blackman

By Rector, Hibben, Davis & Macauley Attys.

Reissued Apr. 23, 1929. Re. 17,282

UNITED STATES PATENT OFFICE.

HORACE L. BLACKMAN, OF JANESVILLE, WISCONSIN, ASSIGNOR, BY MESNE ASSIGNMENTS, TO PEN DESK SET COMPANY, A CORPORATION OF ILLINOIS.

HOLDER FOR FOUNTAIN PENS.

Original No. 1,629,987, dated May 24, 1927, Serial No. 130,115, filed August 19, 1926. Application for reissue filed May 21, 1928. Serial No. 279,582.

My invention relates to the stationery art, and has for its purpose, to provide, in a fountain pen receiving set, a means to yieldingly hold a fountain, or other kind of pen. This particular invention is an improvement upon the inventions of Walter Guyot (Serial No. 83,857, filed January 26, 1926) and of Horace L. Blackman (Serial No. 121,072, filed July 8, 1926), in which a ball and socket joint is employed in a device to receive and position a pen in a desk set.

My invention consists of certain details of construction, hereinafter set forth, pointed out in my claims, and illustrated in the accompanying drawings, in which Fig. 1 shows a sectional view of a desk set provided with my improvement, a fountain pen being shown in position therein;

Figure 1:
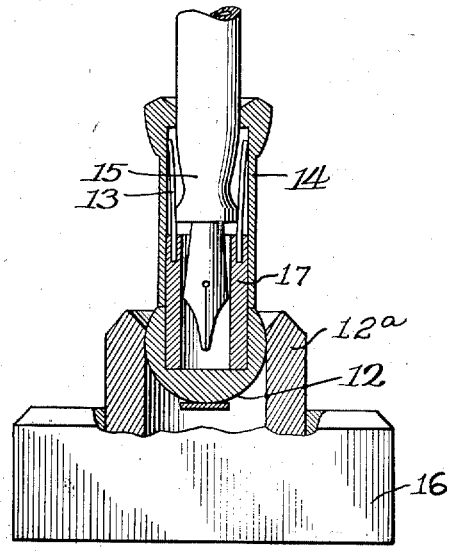
Figure 2:
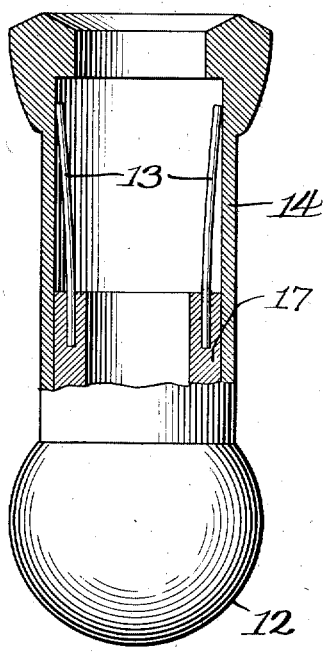
Fig. 2 shows an enlarged sectional view of my invention.
Figure 3:
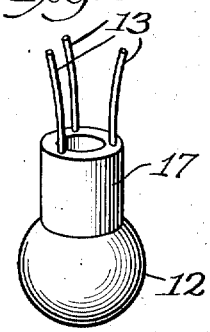
Fig. 3 shows a detail view, in perspective, of the holding fingers I employ.

In the desk set structure which I have chosen to illustrate my present invention I employ the usual ball and socket joint, which includes the ball 12 and socket member 12[a], the latter being mounted upon a main base or support 16 of any desired form. A cylindrical receptable-positioning member or base 17 is supported by the ball 12 for angular adjustment movements therewith, and this member has a plurality of holding fingers 13 projecting therefrom. These fingers 13 are formed, preferably, of spring metal, and they curve outwardly from their mounting to frictionally engage the inner wall of the pen receptacle 14 which I employ. The receptacle 14 is generally cylindrical and is carried by the base or receptacle-positioning member 17.

The pen receptacle 14 is obviously of the proper size and length to receive the tapering end of a fountain pen 15, and the bowed fingers 13, lying inside the receptacle 14 and engaging the receptacle wall, function also to receive, and tensionally press against, the barrel of the pen 15. When the pen 15 is inserted into my holder, it projects downwardly into the receptacle 14, and is yieldingly engaged by the fingers 13.

These fingers 13, curving outwardly from their base, their outer ends engaging the inner wall of the pen receptacle 14 to provide a tension to receive the end of the fountain pen 15, also aid in holding the receptacle 14 yieldingly in proper position.

This construction of a mounting for a pen receiving receptacle may be employed with any desk set, and is not necessarily associated only with a desk set of the construction shown in the Guyot and Blackman applications hereinbefore mentioned.

Having thus described my invention, what I claim, and desire to secure by Letters Patent of the United States, is:

1. In a desk set provided with a ball and socket joint, a pen holding device, comprising a base portion secured to the ball, a plurality of spring fingers extending therefrom and curving outwardly, and a pen receiving receptacle adapted to fit over the fingers and engage the base portion secured to the ball, and be yieldingly held in position thereon.

2. A pen receiving and holding device, in combination with a ball and socket joint on a desk set, comprising spring fingers extending outwardly from the ball and a pen receiving receptacle mounted for movement with the ball and designed to fit over said fingers and be yieldingly engaged thereby.

3. A pen holding means in a desk set, comprising a support, a receptacle positioning member, means for adjustably mounting said member upon said support, fingers extending outwardly from the receptacle positioning member, and a pen receptacle designed to receive said fingers and to fit over the positioning member.

4. A pen holding means in a desk set, comprising a base with spring fingers projecting upwardly therefrom, and a pen receptacle mounted upon said base and adapted to receive the fingers and be frictionally engaged thereby, said fingers also being adapted to engage tensionally the barrel of a pen.

5. A pen holding device, comprising a base; spring fingers, curving outwardly at their outer ends, secured thereto and projecting therefrom; a collar cooperating with said base and fitting over the spring fingers and engaging the outer ends thereof, said fingers being designed to engage the barrel of a pen and tensionally hold it in position.

6. A pen holding device, comprising a base, a receptacle positioning member secured to the base, fingers extending outwardly from the receptacle positioning member, a pen receptacle designed to be received by said fingers and to fit over the positioning member substantially as shown and described.

7. A pen receiving and holding device, comprising a base, spring fingers extending upwardly from the base, a collar cooperating with said base and fitting over the said fingers to engage the ends thereof, said fingers being designed to engage the barrel of a pen and hold it yieldingly in position.

8. A pen receiving and holding device, comprising a base, spring fingers secured thereto, their outer ends curving outwardly, a pen receiving receptacle cooperating with said base and designed to fit over the said fingers and be yieldingly engaged thereby.

9. A pen receiving and holding device, comprising a base, a plurality of spring fingers extending therefrom and curving outwardly, a pen receiving receptacle adapted to fit over the fingers and engage the base portion, and be yieldingly held in position by the fingers.

10. A pen-holding device comprising a pen-receiving receptacle adapted to freely receive the lower end of a pen, means for centering and grippingly holding the lower end of the pen coaxially with the receptacle including a part extending within said receptacle and a plurality of circularly arranged yielding elements which extend longitudinally of said receptacle and are supported by said part, said elements each having a mid-portion spaced inwardly from the receptacle wall and an end part adapted to be frictionally engaged by the wall of said receptacle, said mid-portions being adapted to uniformly engage the end part of the pen and tensionally hold the pen in position.

11. A pen holding means for a desk set comprising a pen-receiving receptacle having a shoulder adapted for receiving the lower end of a fountain pen having a shoulder, a plurality of annularly arranged, longitudinally extending spring fingers within said receptacle, the fingers each having one end fixed within the receptacle and the free end frictionally engaging the wall of the receptacle, the fingers being bowed, so that their bowed portions yieldingly embrace the shoulder on the pen and tensionally hold the pen in centered position in said receptacle.

12. A pen-holding means in a desk set which comprises a pen-receiving receptacle, and a circular member associated with said receptacle and having an annularly arranged group of yieldable fingers extending therefrom, said fingers being bowed so that their mid-portions frictionally engage the lower end of a pen and tensionally hold it in centered position.

13. A pen holding means in a desk set, comprising a base with a ball and socket joint secured therein, a receptacle positioning member secured to the ball, fingers extending outwardly from the receptacle positioning member, a pen receptacle designed to be received by the said fingers and to fit over the positioning member, substantially as shown and described.

14. A pen holding means in a desk set, comprising a base with spring fingers projecting upwardly therefrom, a pen receptacle cooperating with said base and adapted to be received by the fingers and held yieldingly engaged thereby, said fingers also being adapted to engage tensionally the barrel of a pen.

15. A pen-holding means in a desk set which comprises a pen-receiving receptacle, and a circular member associated with said receptacle, said member holding in position an annularly arranged group of yieldable members, said members being so constructed and arranged that their mid-portions are spaced from the wall of the receptacle and lie in the path of and frictionally engage the lower end of a pen when the latter is inserted in said receptacle, to hold the pen in centered position.

16. A holder for fountain pens, comprising a support member, a pen-receiving receptacle, means for swingingly mounting said receptacle on said support member, and a plurality of spring members within said receptacle, said members having a mid-portion spaced inwardly from the receptacle wall for yieldingly gripping the pen inserted therein to retain it in centered position in the receptacle, and means for supporting said members in said receptacle.

17. In a fountain pen desk set, a base member, a pen-receiving receptacle, means for swingingly mounting said receptacle on said base so that it may be swung to a plurality of angular positions relative to said base, and means including a plurality of yieldable, annularly-arranged pen-engaging members mounted in said receptacle and having their mid-portions bowed for engaging and tensionally receiving and holding the lower end of the pen when it is inserted in said receptacle.

HORACE L. BLACKMAN.